United States Patent
Ko

(10) Patent No.: US 10,511,783 B2
(45) Date of Patent: Dec. 17, 2019

(54) ILLUMINATION SENSING SYSTEM AND SURVEILLANCE CAMERA EMPLOYING THE SAME

(71) Applicant: HANWHA TECHWIN CO., LTD., Seongnam-si (KR)

(72) Inventor: Do Won Ko, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 413 days.

(21) Appl. No.: 15/254,392

(22) Filed: Sep. 1, 2016

(65) Prior Publication Data

US 2017/0142310 A1    May 18, 2017

(30) Foreign Application Priority Data

Nov. 18, 2015   (KR) .................. 10-2015-0161724

(51) Int. Cl.
   *H04N 5/235* (2006.01)
   *H04N 7/18* (2006.01)
   *H05B 37/02* (2006.01)

(52) U.S. Cl.
   CPC .......... *H04N 5/2351* (2013.01); *H04N 7/183* (2013.01); *H05B 37/0218* (2013.01); *H05B 37/0227* (2013.01)

(58) Field of Classification Search
   CPC .................................................. H04N 5/2351
   USPC ....................................................... 348/143
   See application file for complete search history.

(56) References Cited

U.S. PATENT DOCUMENTS

| | | | |
|---|---|---|---|
| 5,045,683 A | 9/1991 | Kanda | |
| 5,543,889 A * | 8/1996 | McIntyre | G02B 27/20 396/431 |
| 5,585,697 A * | 12/1996 | Cote | F21S 8/00 250/205 |
| 5,772,326 A * | 6/1998 | Batko | G01K 1/16 236/51 |

(Continued)

FOREIGN PATENT DOCUMENTS

| | | |
|---|---|---|
| KR | 1993-0004897 B1 | 6/1993 |
| KR | 10-2005-0042623 A | 5/2005 |

(Continued)

OTHER PUBLICATIONS

Matsuki, Fumirou et al. "Integrated Ambient Light Sensor with an LTPS Noise-Robust Circuit and a-Si Photodiodes for AMLCDs." IEICE Transactions 93-C (2010): 1583-1589. (Year: 2010).*

(Continued)

*Primary Examiner* — Jeremiah C Hallenbeck-Huber
(74) *Attorney, Agent, or Firm* — Sughrue Mion, PLLC

(57) ABSTRACT

There are provided an illumination sensing system and a surveillance camera including the illumination sensing system. The illumination sensing system includes: an illumination sensor configured to sense input light; a circuit board comprising a mount zone in which the illumination sensor is placed; and at least one line provided on the circuit board and connected to the illumination sensor, wherein the mount zone comprises a mount portion on which the illumination sensor is placed and a surrounding portion located around the mount portion, and wherein at least one penetration hole through which air passes is formed in the circuit board.

19 Claims, 3 Drawing Sheets

(56) References Cited

U.S. PATENT DOCUMENTS

| | | | | |
|---|---|---|---|---|
| 5,939,781 | A * | 8/1999 | Lacap | H01L 23/3677 257/692 |
| 2004/0071035 | A1* | 4/2004 | Poechmueller | G11C 5/005 365/222 |
| 2005/0210656 | A1* | 9/2005 | Howard | G01N 33/0009 29/592.1 |
| 2006/0171704 | A1* | 8/2006 | Bingle | B60R 11/04 396/419 |
| 2011/0012082 | A1* | 1/2011 | Tio Castro | H01L 45/06 257/2 |
| 2011/0121654 | A1* | 5/2011 | Recker | H02J 9/065 307/66 |
| 2012/0169287 | A1* | 7/2012 | Lopin | H02J 7/0057 320/127 |
| 2013/0099666 | A1* | 4/2013 | Stuffle | G09F 9/33 315/52 |
| 2013/0113002 | A1* | 5/2013 | Radermacher | F21K 9/00 257/88 |
| 2013/0148063 | A1* | 6/2013 | Maeda | B60R 1/12 349/114 |
| 2014/0167738 | A1* | 6/2014 | Makinson | H05K 1/0263 324/126 |
| 2015/0062342 | A1* | 3/2015 | Hoek | B60R 1/12 348/148 |
| 2016/0277688 | A1* | 9/2016 | Gaskamp | H04N 5/332 |

FOREIGN PATENT DOCUMENTS

| | | |
|---|---|---|
| KR | 10-2008-0053733 A | 6/2008 |
| KR | 10-2015-0039153 A | 4/2015 |

OTHER PUBLICATIONS

Allan, Alasdair; "Teardown of the TI SensorTag"; Apr. 18, 2013; Make: Magazine, available at https://makezine.com/2013/04/18/teardown-of-the-ti-sensortag/ (Year: 2013).*

* cited by examiner

ILLUMINATION SENSING SYSTEM AND SURVEILLANCE CAMERA EMPLOYING THE SAME

CROSS-REFERENCE TO THE RELATED APPLICATION

This application claims priority from Korean Patent Application No. 10-2015-0161724, filed on Nov. 18, 2015, in the Korean Intellectual Property Office, the disclosure of which is incorporated herein in its entirety by reference.

BACKGROUND

1. Field

Apparatuses and methods consistent with exemplary embodiments relate to an illumination sensing system and a surveillance camera including the illumination sensing system.

2. Description of the Related Art

Devices such as surveillance cameras, illumination devices, televisions, or mobile communication terminals are configured to adjust their brightness or switch operation modes according to the amount of light in surrounding areas. Many devices are equipped with illumination sensing systems to detect the intensity and amount of light in surrounding areas and use results of the detection as operational data.

An illumination sensing system may include an illumination sensor, and the illumination sensor may include a photodiode, an amplifier (AMP), and an analog digital converter (ADC). Such an illumination sensor may include an internal compensation circuit to compensate for variations in measured values caused by environmental factors such as temperature. However, it may be difficult to sufficiently cope with large temperature variations by only using such an internal compensation circuit.

SUMMARY

Exemplary embodiments of the inventive concept provide an illumination sensing system configured to operate without errors caused by the temperature of a surrounding environment and a surveillance camera including the illumination sensing system.

Various aspects of the exemplary embodiments will be set forth in part in the description which follows and, in part, will be apparent from the description, or may be learned by practice of the presented embodiments.

According to one or more embodiments, there is provided an illumination sensing system which may include: an illumination sensor configured to sense input light; a circuit board comprising a mount zone in which the illumination sensor is placed; and at least one line provided on the circuit board and connected to the illumination sensor, wherein the mount zone comprises a mount portion on which the illumination sensor is placed and a surrounding portion located around the mount portion, and wherein at least one penetration hole through which air passes is formed in the circuit board.

The surrounding portion may include a surrounding pattern shaped to be longer than a shortest distance from an end of the mount zone to the mount portion, and the line may be patterned according to a shape of the surrounding pattern.

The surrounding pattern may have a wave, curved or non-straight shape.

The illumination sensing system may further include: a temperature sensor configured to measure a temperature of an environment in which the illumination sensor is located; and a processor to implement an illumination value correction unit configured to correct an illumination sensor value measured by the illumination sensor using a temperature sensor value corresponding to the measured temperature.

The illumination value correction unit may correct the measured illumination sensor value using a following equation:

$$CL = ML - F(T),$$

where CL refers to a corrected illumination value, ML refers to the measured illumination sensor value, and F(T) refers to an illumination sensor value at a given temperature T when no light is incident on the illumination sensor.

The line may be shaped to be longer than a straight distance from an end of the mount zone to the mount portion.

The line may have a smaller width inside the mount zone than outside the mount zone.

An area of the mount zone may be about one to about ten times an area of the mount portion.

The line may have a wave, curved or non-straight shape, the surrounding portion may include a surrounding pattern shaped according to the shape of the line and longer than a shortest distance from an end of the mount zone to the mount portion, and the hole may be one in number and may be formed by patterning a region close to the lines.

According to one or more embodiments, a surveillance camera includes an illumination sensing system, a controller, and a camera, wherein the illumination sensing system includes: an illumination sensor configured to sense input light; a circuit board including a mount zone in which the illumination sensor is placed; and at least one line provided on the circuit board and connected to the illumination sensor, wherein the mount zone includes a mount portion on which the illumination sensor is placed and a surrounding portion located around the mount portion, and at least one penetration hole through which air passes is formed in the circuit board.

The surveillance camera may further include: a temperature sensor configured to measure a temperature of an environment in which the illumination sensor is located; and a processor to implement an illumination value correction unit configured to correct an illumination sensor value measured by the illumination sensor using a temperature sensor value corresponding to the measured temperature.

The line may have a wave, curved or non-straight shape, the surrounding portion may include a surrounding pattern shaped according to the shape of the line and longer than a shortest distance from an end of the mount zone to the mount portion, and the hole may be one in number and may be formed by patterning a region close to the lines.

The controller may control an auto exposure (AE) operation of the camera according to an illumination value output from the illumination sensing system.

The controller may select one of a daytime mode and a night mode according to an illumination value output from the illumination sensing system, and may control the camera such that the camera may use an infrared cut filter in the daytime mode.

The controller may select one of a daytime mode and a night mode according to an illumination value output from the illumination sensing system, and may control the camera such that the camera may use an optical low pass filter in the night mode.

The surveillance camera may further include an illumination unit controllable by the controller, wherein the controller may adjust light intensity of the illumination unit according to an illumination value output from the illumination sensing system.

Other aspects will be clearly understood from the following detailed description, claims, and accompanying drawings.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
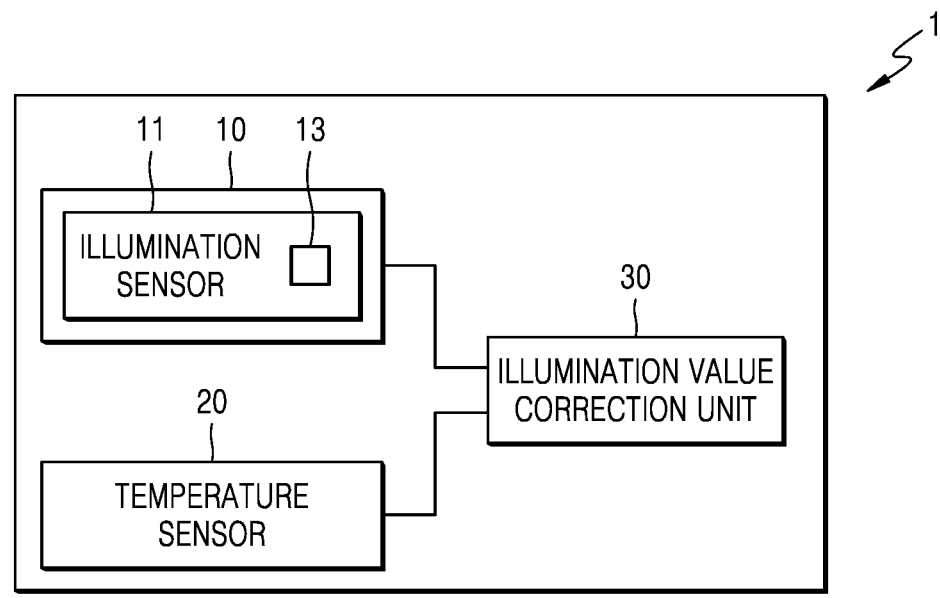
FIG. 1 is a block diagram schematically illustrating an illumination sensing system according to an exemplary embodiment.

Reference will now be made in detail to exemplary embodiments which are illustrated in the accompanying drawings. In this regard, the presented exemplary embodiments may have different forms and should not be construed as being limited to the descriptions set forth herein. Accordingly, these exemplary embodiments are merely described below, by referring to the figures, to explain some aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Structures and operations of illumination sensing systems will now be described according to exemplary embodiments with reference to the accompanying drawings. In the drawings, like reference numerals refer to like elements, and the size of each element may be exaggerated for clarity of illustration.

The exemplary embodiments may, however, have different forms and should not be construed as being limited to the descriptions set forth herein. Rather, these embodiments are provided so that this disclosure will be thorough and complete, and will fully convey the scope of the inventive concept to those skilled in the art. Therefore, the scope of the inventive concept should be defined by the claims.

In the following description, technical terms are used only for explaining the exemplary embodiments, and not for purposes of limitation. The terms of a singular form may include plural forms unless specifically mentioned. In the following description, the terms "comprises" and/or "comprising" specify the presence of stated elements, operations, and/or devices, but do not preclude the presence or addition of one or more other elements, operations, and/or devices. It will be understood that although the terms "first", "second", etc. may be used herein to describe various elements, these elements should not be limited by these terms. These terms are only used to distinguish one element from another.

In the drawings, the sizes of elements may be exaggerated for clarity. For example, in the drawings, the size or thickness of each element may be arbitrarily shown for illustrative purpose, and thus the inventive concept should not be construed as being limited thereto.

FIG. 1 is a block diagram schematically illustrating an illumination sensing system 1 according to an exemplary embodiment.

Referring to FIG. 1, the illumination sensing system 1 may include an illumination sensor unit 10. In addition, the illumination sensing system 1 may further include a temperature sensor 20 and an illumination value correction unit 30.

The illumination sensor unit 10 includes a shaped circuit board (not shown) and an illumination sensor 11. The shaped circuit board will be described later with reference to FIGS. 2 to 4.

The illumination sensor 11 is used to detect brightness. The illumination sensor 11 may convert intensity of light into an electric signal. The illumination sensor 11 may include a light detecting element such as photodiode. The illumination sensor 11 may further include an amplifier (AMP) and/or an analog digital converter (ADC). In the illumination sensor 11, a current generated according to an amount of light incident on the light detecting element may be measured and converted into an illumination value using the ADC.

The illumination sensor 11 may include an internal temperature compensation circuit 13. The light detecting element of the illumination sensor 11 may output a current according to the amount of incident light. Besides this, the light detecting element of the illumination sensor 11 may output a current due to other factors such as temperature, and this current is called a dark current. The internal temperature compensation circuit 13 may compensate for errors caused by such a dark current. However, the internal temperature compensation circuit 13 may be omitted.

The temperature sensor 20 may measure a temperature of an environment in which the illumination sensor 11 is located. The temperature sensor 20 and the illumination value correction unit 30 may compensate for errors of the illumination sensor 11 caused by external temperature variations.

The temperature sensor 20 and the illumination sensor 11 may be arranged on the same circuit board, or the temperature sensor 20 may be placed on a board adjacent to a circuit board on which the illumination sensor 11 is placed. As long as the temperature sensor 20 is capable of measuring the temperature of the environment in which the illumination sensor 11 is located, the position of the temperature sensor 20 is not limited.

If high power devices are arranged around the illumination sensor 11, the temperature of the environment in which the illumination sensor 11 is located may be markedly varied, and thus the illumination sensor 11 may make many errors. Such errors may not be managed only by the internal temperature compensation circuit 13.

Table 1 below shows values output from the illumination sensor 11 according to temperatures when the amount of light incident on the illumination sensor 11 is zero. Referring to Table 1, a dark current is not output from the illumination sensor 11 at a temperature of 10° C. or lower, and as temperature increases, the values output from the illumination sensor 11 markedly increase because of the dark current.

Table 2 below shows values output from the illumination sensor 11 with respect to the intensity of light at a temperature not causing dark current (for example, 10° C.). Referring to Tables 1 and 2, for example, if illumination sensor value correction is not performed, the value of illumination may be measured as about 10 Lux at 90° C.

TABLE 1

| | Temperature (° C.) | | | | | | | |
|---|---|---|---|---|---|---|---|---|
| | 10 | 20 | 30 | 40 | 50 | 60 | 70 | 80 | 90 |
| Illumination sensor values | 0 | 32 | 64 | 112 | 156 | 212 | 544 | 1240 | 1584 |

TABLE 2

| | Illumination (Lux) | | | | |
|---|---|---|---|---|---|
| | 1 | 5 | 10 | 15 | 20 |
| Illumination sensor values | 340 | 900 | 1580 | 2220 | 2680 |

The illumination value correction unit 30 may find a functional relationship F(T) between illumination sensor values and temperatures when the amount of light incident on the illumination sensor 11 is zero, and may correct measured illumination sensor values ML by subtracting temperature-induced illumination sensor values from the measured illumination sensor values ML. That is, a corrected illumination value CL may be expressed by the following equation:

$$CL=ML-F(T)$$

The illumination value correction unit 30 may include a memory and a central processing unit (CPU) to calculate the corrected illumination value CL and evaluate illumination around the illumination sensor 11.

However, if the temperature of the illumination sensor 11 is outside a certain range, correction values of the illumination value correction unit 30 may have errors. In some embodiments, a circuit board on which the illumination sensor 11 is placed may be shaped to reduce heat transfer to the illumination sensor 11.

Figure 2:
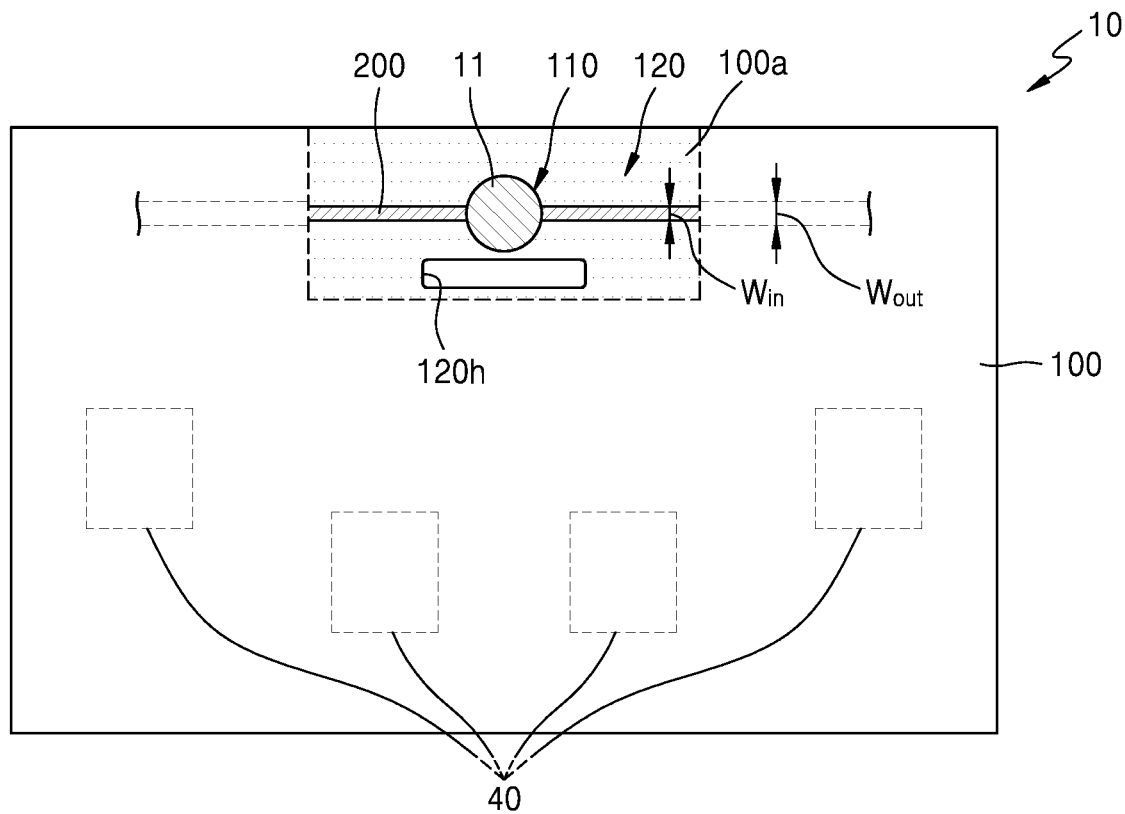
FIG. 2 is a plan view schematically illustrating an illumination sensor unit according to an exemplary embodiment.
Figure 3:
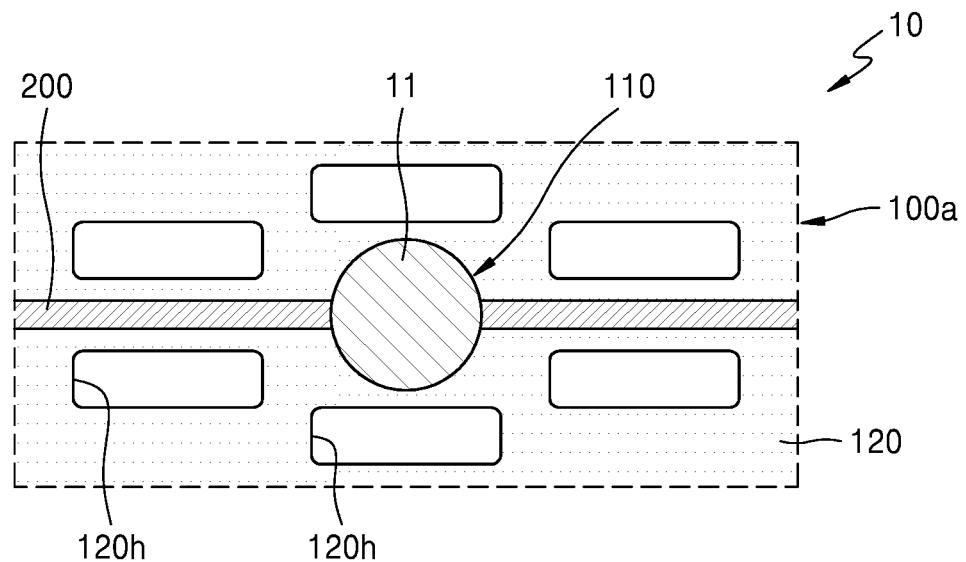
FIG. 3 is a plan view schematically illustrating an illumination sensor unit according to another exemplary embodiment.
Figure 4:
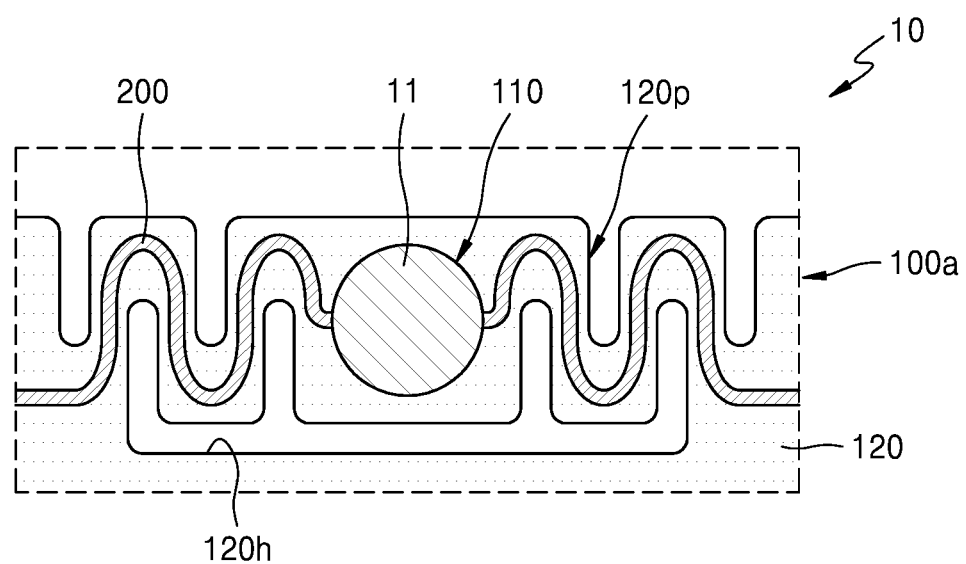
FIG. 4 is a plan view schematically illustrating an illumination sensor unit according to another exemplary embodiment.

FIGS. 2 to 4 are plan views illustrating illumination sensor units 10 according to exemplary embodiments.

Referring to FIGS. 2 to 4, each of the illumination sensor units 10 includes an illumination sensor 11, a circuit board 100, and lines 200.

The circuit board 100 includes a mount zone 100a in which the illumination sensor 11 is placed. The mount zone 100a includes a mount portion 110 on which the illumination sensor 11 is placed, and a surrounding portion 120 around the mount portion 110. The surrounding portion 120 includes at least one penetration hole 120h through which air passes.

The circuit board 100 may be a printed circuit board (PCB), and various components 40 may be arranged on the circuit board 100. The components 40 may include high power devices.

The mount zone 100a includes the mount portion 110 on which the illumination sensor 11 is placed, and the surrounding portion 120 located around the mount portion 110. The area of the mount zone 100a may be about one to about ten times the area of the mount portion 110 on which the illumination sensor 11 is placed. The mount zone 100a may be located on an end of the circuit board 100.

As described above, the mount zone 100a includes the mount portion 110 on which the illumination sensor 11 is placed, and the surrounding portion 120 located around the mount portion 110. The at least one penetration hole 120h through which air passes is formed in the surrounding portion 120.

The penetration hole 120h is formed through the circuit board 100, and air may pass through the penetration hole 120h. Owing to the penetration hole 120h, air may smoothly flow in the environment in which the illumination sensor 11 is located, and thus a relatively low thermal load may be applied to the illumination sensor 11. The penetration hole 120h may have a circular shape, an elliptical shape, a polygonal shape, or an arbitrary shape as shown in FIG. 4. A single penetration hole 120h may be formed in the surrounding portion 120 (refer to FIG. 2), or a plurality of penetration holes 120h may be formed in the surrounding portion 120 (refer to FIG. 3). The positions of the penetration hole 120h may not be limited to the above examples. The penetration hole 120h may be disposed anywhere in the circuit board 100 which may be able to reduce thermal load and/or heat transfer to the illumination sensor 11.

The lines 200 may be provided on the circuit board 100 and connected to the illumination sensor 11 to transmit illumination sensor values measured by the illumination sensor 11. The various components 40 arranged on the circuit board 100 may emit heat, and the heat may be transferred to the illumination sensor 11 through the lines 200. To reduce heat transfer through the lines 200, the width Win of the lines 200 inside the mount zone 100a may be smaller than the width Wout of the lines 200 outside the mount zone 100a.

The lines 200 may have a length longer than a straight distance from an end of the mount zone 100a to the mount portion 110. For example, the lines 200 may be patterned in a wave shape (refer to FIG. 4), a W shape, or a zigzag shape. In this manner, heat transfer to the illumination sensor 11 may be reduced.

Regions of the mount zone 100a in which the lines 200 are not formed may not include a conductive material.

Referring to FIG. 4, the illumination sensor unit 10 includes an illumination sensor 11, a shaped circuit board 100, and lines 200. In FIG. 4, the same reference numerals as those used in FIG. 2 refer to the same elements, and descriptions thereof will not be repeated for clarity.

The circuit board 100 illustrated in FIG. 4 includes a shaped mount zone 100a in which the illumination sensor 11 is placed. At least one penetration hole 120h is formed in a surrounding portion 120 of the mount zone 100a, and a surrounding pattern 120p is formed to be longer than a shortest distance from an end of the mount zone 100a to a mount portion 110 of the mount zone 100a on which the illumination sensor 11 is placed. The surrounding pattern 120p may be formed by patterning the circuit board 100 in a shape such as a wave shape, a W shape, or a zigzag shape. Since the circuit board 100 is patterned, a heat transfer path of the circuit board 100 may be elongated, and thus heat transfer to the illumination sensor 11 may be reduced.

The lines 200 may be provided on the circuit board 100 and connected to the illumination sensor 11 to transmit illumination sensor values measured by the illumination sensor 11. The lines 200 may be patterned according to the shape of the surrounding pattern 120p. The lines 200 may be patterned in a shape such as a wave shape, a W shape, or a zigzag shape according to the shape of the surrounding pattern 120p.

As described above, according to the one or more of the above embodiments, the illumination sensing system 1 includes the penetration hole 120h formed in the circuit board 100 in a region adjacent to the illumination sensor 11, and thus the illumination sensor 11 may receive a relatively low thermal load. In addition, regions of the circuit board 100 and/or the lines 200 adjacent to the illumination sensor 11 are shaped to reduce heat transfer to the illumination sensor 11.

Figure 5:
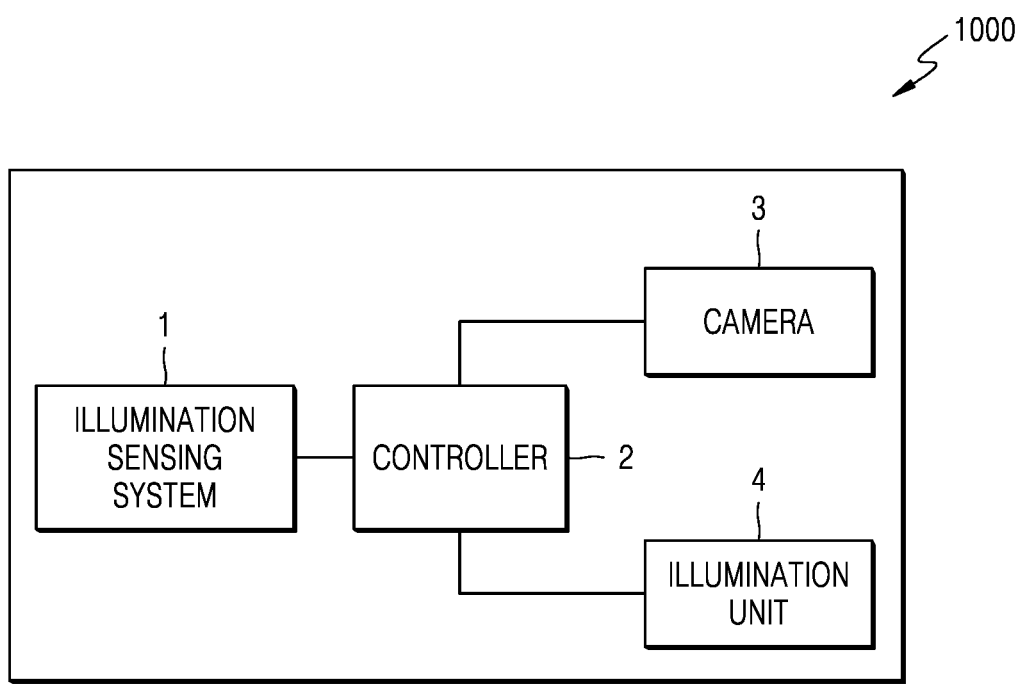
FIG. 5 is a block diagram schematically illustrating a surveillance camera according to an exemplary embodiment.

FIG. 5 is a block diagram illustrating a surveillance camera 1000 including an illumination sensing system 1 according to an embodiment.

The surveillance camera 1000 includes the illumination sensing system 1, a controller 2, and a camera 3. The surveillance camera 1000 may further include an illumination unit 4.

The controller 2 may adjust an auto exposure (AE) operation of the camera 3 according to illumination values output from the illumination sensing system 1.

In addition, the controller 2 may control the camera 3 in a daytime mode or a night mode according to illumination values output from the illumination sensing system 1. For example, the controller 2 may control the camera 3 such that the camera 3 may use an infrared cut filter in the daytime mode and may use an optical low pass filter in the night mode.

As described above, when the surveillance camera 1000 includes the illumination unit 4, light intensity of the illumination unit 4 may be adjusted according to illumination values output from the illumination sensing system 1.

When the illumination sensing system 1 of any one of the above-described embodiments is applied to the surveillance camera 1000, illumination values may be precisely determined without temperature-induced errors, and thus the surveillance camera 1000 may not malfunction.

As described above, according to the one or more of the above embodiments, the illumination sensing system may precisely detect illumination values owing to the shape of the circuit board and/or temperature compensation. However, the inventive concept is not limited thereto.

At least one of the components, elements, modules or units represented by a block as illustrated in FIGS. 1 and 5, e.g., the illumination value correction unit 30 and the illumination unit 4, may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like It should be understood that the exemplary embodiments described herein should be considered in a descriptive sense only and not for purposes of limitation. Descriptions of features or aspects within each embodiment should typically be considered as available for other similar features or aspects in other embodiments.

While the above exemplary embodiments have been described with reference to the figures, it will be understood by those of ordinary skill in the art that various changes in form and details may be made therein without departing from the spirit and scope of the inventive concept as defined by the following claims.

What is claimed is:

1. An Illumination sensing system comprising:
an illumination sensor configured to sense input light;
a circuit board comprising a mount zone in which the illumination sensor is placed and one or more additional components mounted on the circuit board outside of the mount zone; and
at least one line provided on the circuit board and connected to the illumination sensor,
wherein the mount zone comprises a mount portion, on which the illumination sensor is placed, and a surrounding portion located adjacent to the mount portion,
wherein at least one penetration hole through which air passes is formed in the surrounding portion of the circuit board,
wherein the surrounding portion comprises a surrounding pattern which has a wave shape defined by and adjacent to the at least one penetration hole so that the mount zone is not provided with a straight heat transfer path to an end of the mount zone, and
wherein the line is patterned to have a wave shape according to the wave shape of the surrounding pattern.

2. The illumination sensing system of claim 1, wherein the surrounding pattern is shaped to be longer than a shortest distance from the end of the mount zone to the mount portion.

3. The illumination sensing system of claim 1, further comprising:
a temperature sensor configured to measure a temperature of an environment in which the illumination sensor is located; and
a processor to implement an illumination value correction unit configured to correct an illumination sensor value measured by the illumination sensor using a temperature sensor value corresponding to the measured temperature.

4. The illumination sensing system of claim 3, wherein the illumination value correction unit corrects the measured illumination sensor value using a following equation:

$CL = ML - F(T)$, where CL refers to a corrected illumination value, ML refers to the measured illumination sensor value, and F(T) refers to an illumination sensor value at a given temperature T when no light is incident on the illumination sensor.

5. The illumination sensing system of claim 1, wherein the line is shaped to be longer than a straight distance from the end of the mount zone to the mount portion.

6. The illumination sensing system of claim 1, wherein the line has a smaller width inside the mount zone than outside the mount zone.

7. The illumination sensing system of claim 1, wherein an area of the mount zone is one to ten times an area of the mount portion.

8. The illumination sensing system of claim 1,
wherein the surrounding pattern is shaped according to the shape of the line and longer than a shortest distance from the end of the mount zone to the mount portion, and
wherein the hole is one in number and is formed by patterning a region close to the lines.

9. The illumination sensing system of claim 1, wherein the hole is formed in the surrounding portion.

10. An Illumination sensor unit provided in a camera, the illumination sensor unit comprising:
an illumination sensor configured to sense input light;
a circuit board comprising a mount zone and one or more additional components mounted on the circuit board outside of the mount zone, the mount zone comprising a mount portion on which the illumination sensor is disposed,
wherein connection between the mount portion and the rest of the circuit board forms a heat transfer pattern which is not straight,
wherein the circuit board further comprises at least one penetration hole through which air passes and at least one line provided thereon and connected to the illumination sensor,
wherein the surrounding portion comprises a surrounding pattern which has a wave shape defined by and adjacent to the at least one penetration hole so that the mount zone is not provided with a straight heat transfer path to an end of the mount zone, and
wherein the line is patterned to have a wave shape according to the wave shape of the surrounding pattern.

11. The illumination sensor unit of claim 10, wherein the hole is formed in the rest of the circuit board.

12. The illumination sensor unit of claim 10, further comprising:
a temperature sensor configured to measure a temperature of an environment in which the illumination sensor is located; and
a processor to implement an illumination value correction unit configured to correct an illumination sensor value measured by the illumination sensor using a temperature sensor value corresponding to the measured temperature.

13. A surveillance camera comprising an illumination sensing system, a controller, and a camera,
wherein the illumination sensing system comprises:
an illumination sensor configured to sense input light;
a circuit board comprising a mount zone in which the illumination sensor is placed and one or more additional components mounted on the circuit board outside of the mount zone; and
at least one line provided on the circuit board and connected to the illumination sensor,
wherein the mount zone comprises a mount portion, on which the illumination sensor is placed, and a surrounding portion located adjacent to the mount portion,
wherein at least one penetration hole through which air passes is formed in the surrounding portion of the circuit board,
wherein the surrounding portion comprises a surrounding pattern which has a wave shape defined by and adjacent to the at least one penetration hole so that the mount zone is not provided with a straight heat transfer path to an end of the mount zone, and
wherein the line is patterned to have a wave shape according to the wave shape of the surrounding pattern.

14. The surveillance camera of claim 13, further comprising:
a temperature sensor configured to measure a temperature of an environment in which the illumination sensor is located; and
a processor to implement an illumination value correction unit configured to correct an illumination sensor value measured by the illumination sensor using a temperature sensor value corresponding to the measured temperature.

15. The surveillance camera of claim 13,
wherein the surrounding pattern is shaped to be longer than a shortest distance from the end of the mount zone to the mount portion, and
wherein the hole is one in number and is formed by patterning a region close to the lines.

16. The surveillance camera of claim 13, wherein the controller controls an auto exposure (AE) operation of the camera according to an illumination value output from the illumination sensing system.

17. The surveillance camera of claim 13, wherein the controller selects one of a daytime mode and a night mode according to an illumination value output from the illumination sensing system, and controls the camera such that the camera uses an infrared cut filter in the daytime mode.

18. The surveillance camera of claim 13, wherein the controller selects one of a daytime mode and a night mode according to an illumination value output from the illumination sensing system, and controls the camera such that the camera uses an optical low pass filter in the night mode.

19. The surveillance camera of claim 13, further comprising an illumination unit controllable by the controller,
wherein the controller adjusts light intensity of the illumination unit according to an illumination value output from the illumination sensing system.

* * * * *